United States Patent
Mak et al.

(10) Patent No.: US 9,577,762 B2
(45) Date of Patent: Feb. 21, 2017

(54) SUBCARRIER POWER BALANCE CONTROL

(75) Inventors: Gary Mak, Ottawa (CA); Mohammad Sotoodeh, Ottawa (CA)

(73) Assignee: Ciena Corporation, Hanover, MD (US)

( * ) Notice: Subject to any disclaimer, the term of this patent is extended or adjusted under 35 U.S.C. 154(b) by 487 days.

(21) Appl. No.: 13/300,956

(22) Filed: Nov. 21, 2011

(65) Prior Publication Data

US 2013/0129348 A1   May 23, 2013

(51) Int. Cl.
| | |
|---|---|
| *H04B 17/00* | (2015.01) |
| *H04B 10/564* | (2013.01) |
| *H04B 10/079* | (2013.01) |
| *H04B 10/548* | (2013.01) |

(52) U.S. Cl.
CPC ...... *H04B 10/564* (2013.01); *H04B 10/07953* (2013.01); *H04B 10/548* (2013.01); *H04B 2210/07* (2013.01)

(58) Field of Classification Search
USPC ............................... 398/94, 15, 38, 197, 209
See application file for complete search history.

(56) References Cited

U.S. PATENT DOCUMENTS

| | | | | |
|---|---|---|---|---|
| 5,513,029 | A * | 4/1996 | Roberts | 398/32 |
| 8,406,637 | B2 * | 3/2013 | Webb et al. | 398/197 |
| 2002/0178417 | A1 * | 11/2002 | Jacob et al. | 714/752 |
| 2010/0135656 | A1 * | 6/2010 | Khurgin et al. | 398/43 |

OTHER PUBLICATIONS

ITU-T G 694.2, Series G: Transmission Systems and Media, Digital Systems and Networks, Dec. 2003.

* cited by examiner

*Primary Examiner* — Shi K Li
*Assistant Examiner* — Mina Shalaby
(74) *Attorney, Agent, or Firm* — Clements Bernard Walker PLLC; Christopher L. Bernard; Lawrence A. Baratta, Jr.

(57) ABSTRACT

A method of controlling a multiple sub-carrier optical channel of an optical communications system. The multiple sub-carrier optical channel includes at least two sub-carriers modulated with respective sub-channel data streams within a spectral range allocated to a single optical channel of the optical communications system. A transmitter modem of the optical communications system applies a respective dither signal to each sub-carrier. A receiver modem of the optical communications system detects a respective quality metric of each sub-carrier. A respective optimum power level of each sub-carrier is estimated based on the applied dither signals and the detected quality metrics. A respective power level of each sub-carrier is then adjusted in accordance with the estimated respective optimum power level of each sub-carrier.

20 Claims, 4 Drawing Sheets

SUBCARRIER POWER BALANCE CONTROL

CROSS-REFERENCE TO RELATED APPLICATIONS

This application is the first application filed for the present invention.

MICROFICHE APPENDIX

Not Applicable.

TECHNICAL FIELD

The present invention relates generally to optical communication systems, and in particular to systems and methods for subcarrier power balance control in an optical communication system.

BACKGROUND

For the purposes of the present disclosure, an optical channel shall be understood to refer to a physical layer connection through an optical network between a single transmitter modem and a single receiver modem. Typically, each optical channel will be allocated a predetermined spectral band, and thus will have a known central wavelength and spectral width (which may be represented as a nominal spacing between the central wavelengths of adjacent channels). For example, ITU-T Rec. G.694.2 recommends a spectral grid of optical channels in which the respective central wavelengths are separated by 20 nm.

It is common practice to convey user data through an optical channel by modulating the user data onto a single narrow-band optical carrier light having a mean wavelength corresponding to the channel's central wavelength. However, more recent developments contemplate the use of two or more narrow-band subcarrier lights which are spaced apart within the spectral band allocated to one optical channel. Each subcarrier light may be modulated with a respective different portion of the user data. Because all of the subcarrier lights of a given optical channel lie within the optical channel's spectral band, they cannot be separately routed through the network and cannot be added or dropped independently of the other subcarriers of the channel. As such, all of the subcarriers of a given optical channel will be routed through the network together, between the transmitting and receiving modems allocated to that optical channel. This feature clearly distinguishes a multiple subcarrier optical channel from a wavelength division multiplexed (WDM) signal well known in the art.

A problem with multiple subcarrier optical channels has been identified, in that the bit error rate (BER) of the optical channel is dominated by the signal-to-noise (SNR) of the subcarrier having the lowest optical power. It is therefore desirable to equalize the respective optical power levels of the subcarrier lights within a given optical channel.

SUMMARY

Disclosed herein are techniques for equalizing subcarrier power level in an optical communications system.

Accordingly, an aspect of the present invention provides a method of of controlling a multiple sub-carrier optical channel of an optical communications system. The multiple sub-carrier optical channel includes at least two sub-carriers modulated with respective sub-channel data streams within a spectral range allocated to a single optical channel of the optical communications system. A transmitter modem of the optical communications system applies a respective dither signal to each sub-carrier. A receiver modem of the optical communications system detects a respective quality metric of each sub-carrier. A respective optimum power level of each sub-carrier is estimated based on the applied dither signals and the detected quality metrics. A respective power level of each sub-carrier is then adjusted in accordance with the estimated respective optimum power level of each sub-carrier.

BRIEF DESCRIPTION OF THE DRAWINGS

Representative embodiments of the invention will now be described by way of example only with reference to the accompanying drawings, in which.

It will be noted that throughout the appended drawings, like features are identified by like reference numerals.

DETAILED DESCRIPTION

Figure 1A:
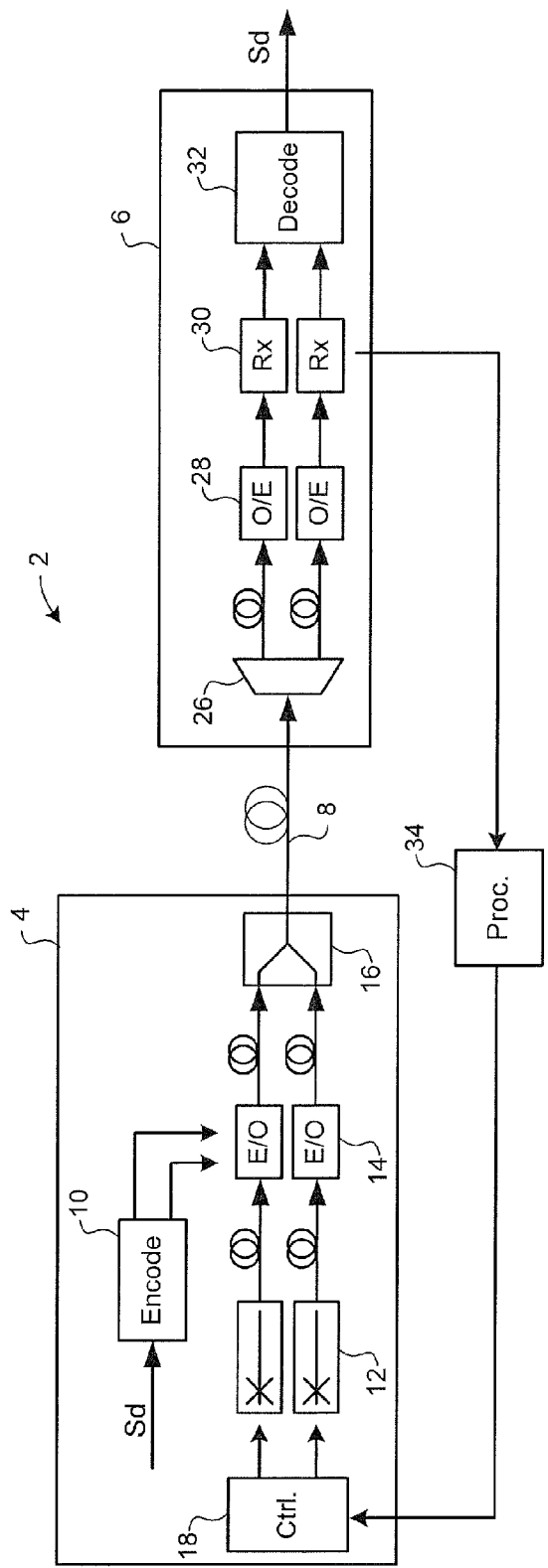
FIGS. 1A-1D are block diagrams schematically illustrating respective embodiments of an optical communications system.

Referring to FIG. 1A, there is shown a representative optical communication system 2, in a transmitting modem 2 and a receiving modem 4 are connected by an optical fiber link 8. In the illustrated embodiment, a subscriber data flow Sd is encoded by an encoder 10 to generate a pair of sub-channel data streams, each of which is modulated on a respective sub-carrier light for transmission through the link 8 to the receiver modem 6. The transmitting modem 2 comprises a pair of narrow-band laser emitters 12, each of which is configured to output a respective sub-carrier light. Each sub-carrier light is modulated with a respective sub-channel data stream using an electrical-to-optical (E/O) converter 14, and the modulated sub-carriers combined by an optical combiner 16 to yield a multiple sub-carrier optical channel signal for transmission through the fiber link 8. For ease of reference, each modulated sub-carrier may be referred to as a sub-channel. A controller 18 may be connected to enable control of the optical output power level of each laser emitter 12.

Figure 2:
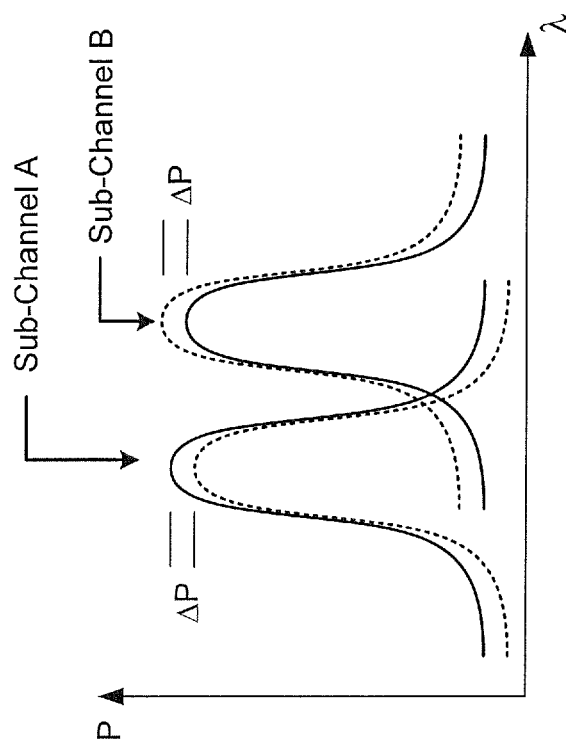
FIG. 2 is a spectral diagram illustrating an optical spectrum of a representative multiple sub-carrier optical channel.

FIG. 2 illustrates the spectrum of the multiple sub-carrier optical channel signal, which comprises a pair of sub-channels (denoted as sub-channel A and sub-channel B). Each sub-channel has a nominally equal spectral width, but will normally have different power levels, although neither of these characteristics is essential. However, the total spectral width of the multiple sub-carrier optical channel signal will correspond with the spectral width allocated to a single optical channel in the optical communication system 2, including allowances for guard-bands between channels and channel groups.

The optical fiber link 8 may comprise any combination of optical links, sub-links, and equipment including (but not limited to); Optical amplifiers; Optical switches; Optical Add/Drop Multiplexers (OADMs); wavelength blockers and MUX/DEMUX devices. For example, the multiple subcarrier optical channel signal output from the transmitting modem 4 may be multiplexed with other optical channel signals in a Wavelength Division Multiplexed (WDM) signal and conveyed through an optical communications network to a receiver node at which the multiple sub-carrier optical channel signal is demultiplexed from the WDM signal and supplied to the receiver modem 6.

It will be appreciated that each of the sub-channel data streams may be generated in any suitable manner, and in any suitable signal format. The encoder 10 shown in FIG. 1A represents merely one of may possible embodiments, and is shown primarily for ease of illustration and description.

Figure 1B:
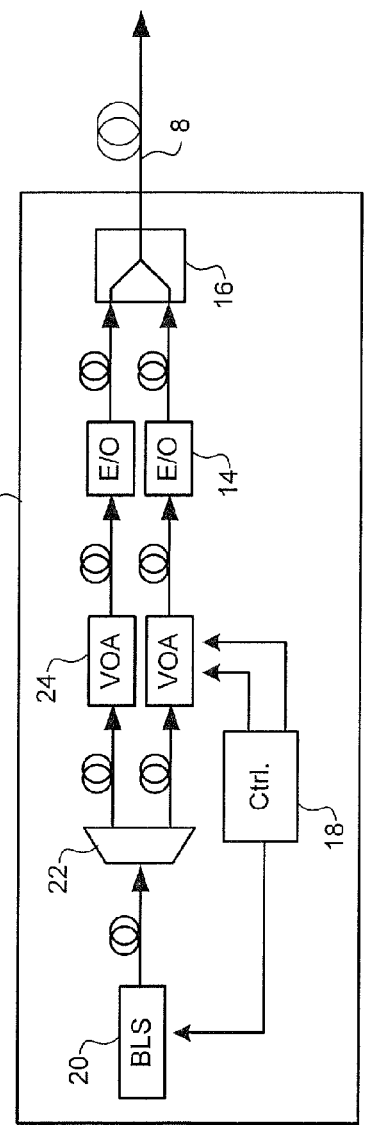
Figure 1C:
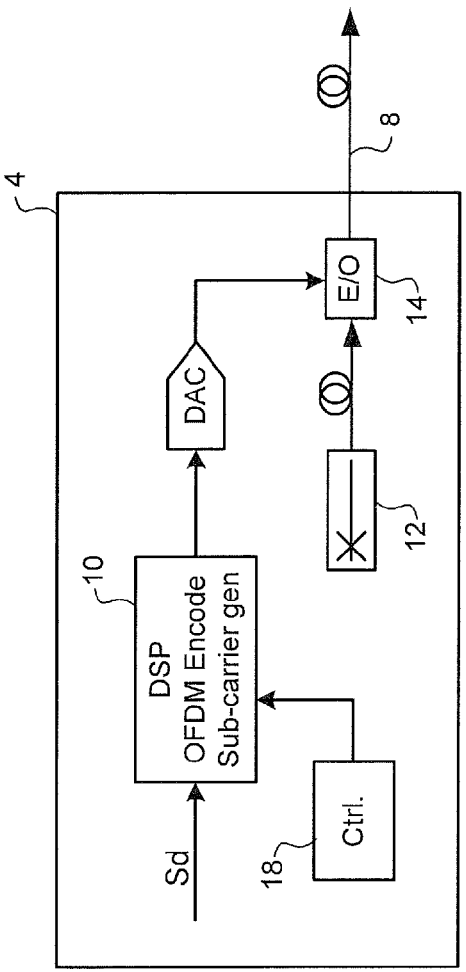

Similarly, it will be appreciated that the sub-carrier lights can be generated by various means other than by the use of narrow-band laser emitters 12. For example, FIG. 1B shows an alternative embodiment in which a broadband light source 20 (such as a light emitting diode) is cascaded with an optical filter 22 to produce the required sub-carrier lights. In this embodiment, the controller 18 is configured to control the power level of each sub-carrier light by controlling the power level of the broadband light source 20 and a respective variable optical attenuator 24 in the path of each sub-carrier light. FIG. 1C shows a further alternative embodiment, in which a single narrow-band laser emitters 12 is cascaded with a complex E/O converter 14 such as, for example, a nested Mach-Zehnder modulator. In this case, the encoder 10 may be configured as a digital signal processor (DSP) designed to synthesize a multiple-sub-carrier signal using, for example, Optical Orthogonal Frequency Division Multiplexing techniques. The resulting encoded digital signal is then converter to an analog drive signal and used to drive the E/O converter 14 to produce the desired multiple sub-carrier optical signal for transmission though the optical link 8. In this embodiment, the controller 18 is configured to control the power level of each sub-carrier light by supplying appropriate control signals to the encoder 10. In some embodiments, the controller 18 may be integrated with the encoder 10

In the embodiment of FIG. 1A, the receiver modem 6 comprises a filter-based demux 26 for demultiplexing the sub-carriers from the received optical channel signal, and for outputting each sub-carrier to a respective Optical-to-Electric (O/E) converter 28. Each O/E converter 28 may be implemented using any suitable optical detection technique including (without limitation) direct detection or coherent detection. The output of each O/E converter 28 is supplied to a respective receiver 30 for detection and recovery of the sub-channel data stream modulated on the respective sub-carrier. The recovered sub-channel data streams may then be supplied to a decoder 32, for recovery of the original subscriber data flow Sd.

Figure 1D:
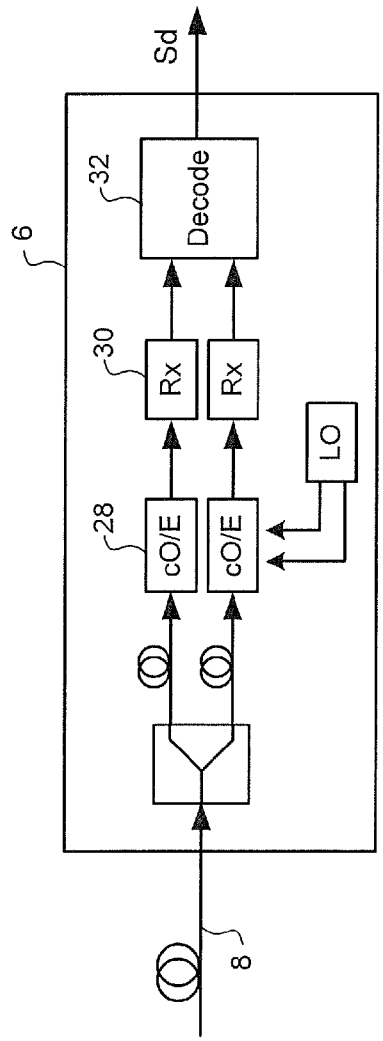

In the embodiment of FIG. 1A, a filter-based demux 26 is used. Known narrow-band optical filtering techniques, such as fiber Bragg gratings, for example, may be used for this purpose. However, this is not essential. Other suitable techniques may be used to separate the sub-carriers, if desired. For example, FIG. 1D illustrates an embodiment in which the O/E converters 28 are implemented using coherent detection techniques known in the art. In this case, the filter-based demux 26 is unnecessary and each coherent O/E converter 28 may employ a local oscillator signal tuned to the center frequency of its respective sub-carrier, either alone or in combination with filters, to detect the sub-channel data stream modulated on the desired sub-carrier while rejecting the other sub-carriers of the optical channel. In another coherent example, there may be only one O/E converter 28 and only one local oscillator signal, and the sub-channel signals are extracted by the decoder 32 using digital signal processing techniques.

For ease of illustration, the embodiments of FIGS. 1A-D implement a multiple sub-carrier optical channel comprising two sub-carriers. It will be apparent to those of ordinary skill in the art that these embodiments can be readily extended to more than two sub-carriers, as desired, limited primarily by the spectral range of the channel and the performance of the demux 26 (or coherent detection and subsequent digital signal processing).

Referring back to FIG. 1A, a processor 34 (which may be co-located with either of the transmitter or receiver modems 4,6, or alternatively at a remote location in communication with the involved modems) is configured to control adjustment of the power level of each sub-carrier to optimise the BER of the optical channel. A representative algorithm that may be implemented by the processor 34 is described below with reference to FIGS. 2-4.

Figure 3:
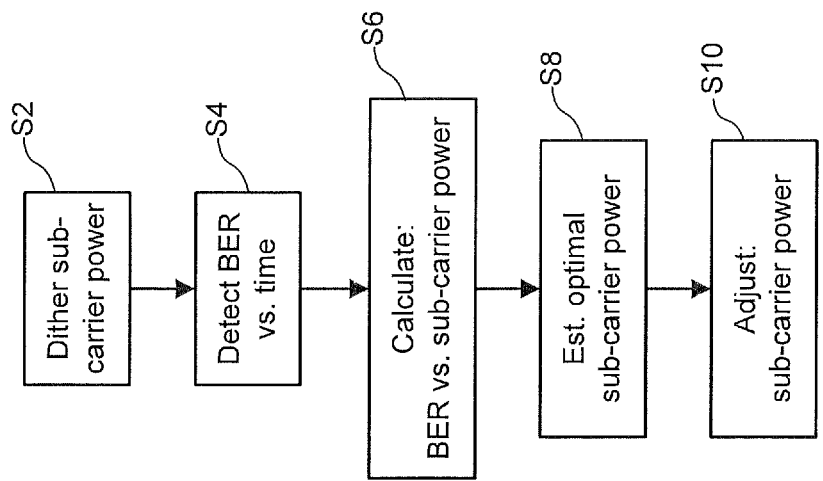
FIG. 3 is a flow-chart illustrating principle steps in a method according to a representative embodiment of the present invention.
Figure 4:
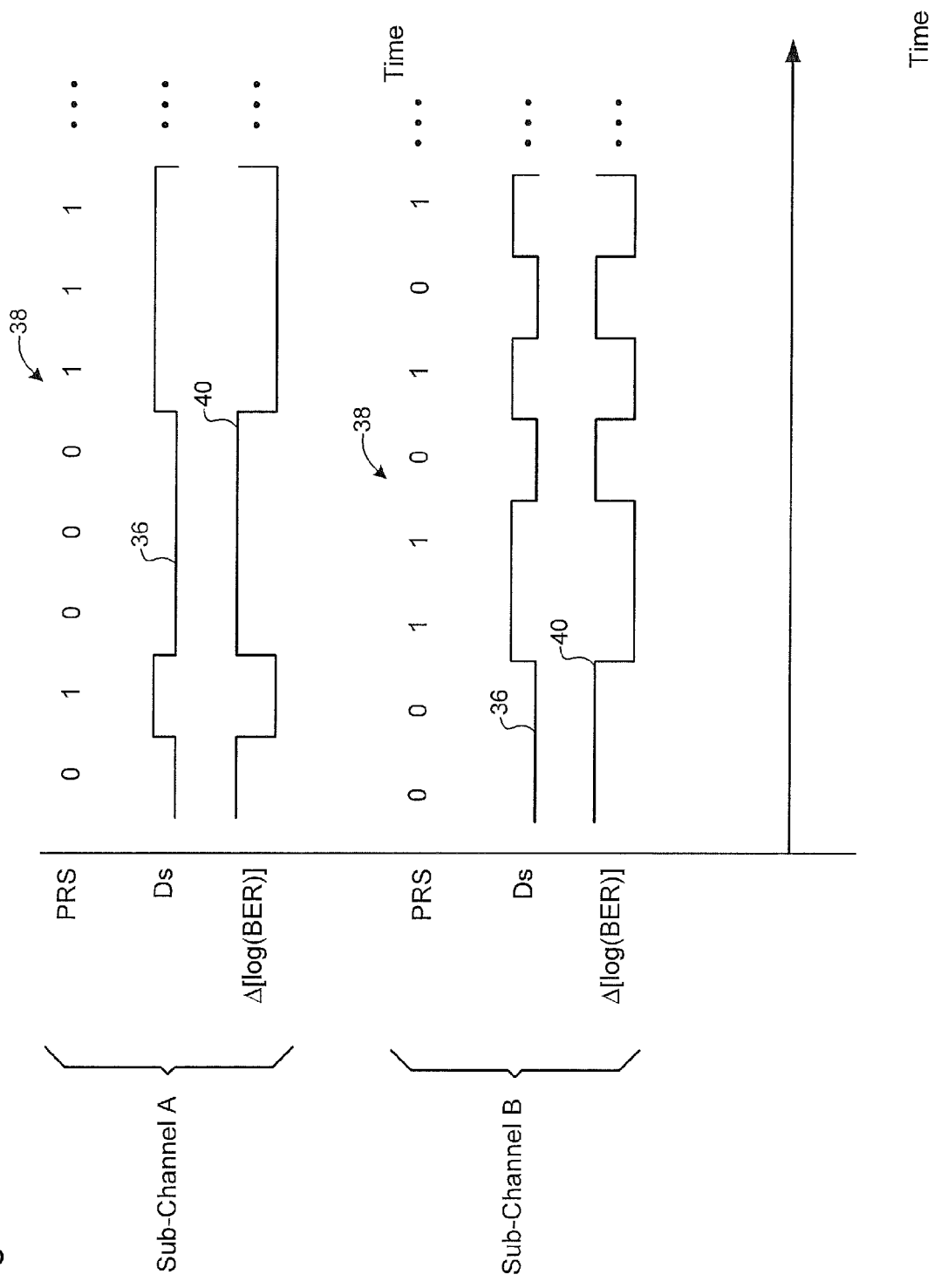
FIG. 4 is a timing chart showing relationships between signals usable in the method of FIG. 3.

FIGS. 3 and 4 illustrate principle steps in a representative channel optimization algorithm. If desired, the channel optimization algorithm may be executed iteratively, at predetermined intervals. In a first step, the processor 34 interacts with the controller 18 to apply a dither signal Ds 36 (FIG. 4) to each sub-carrier. In the illustrated embodiment, the dither signal is applied by modulating the power level P of the respective sub-carrier light. As may be seen in FIG. 2, this has the effect of varying the power level of each sub-carrier light by a modulation depth ΔP, which may be less than 1 dB. In some embodiments, ΔP may be 0.1 dB. It is preferable (but not essential) to dither all of the sub-carriers simultaneously. This has an advantage in that each cycle of an iterative optimization process can be completed in less time. In embodiments in which sub-carriers are simultaneously dithered, it is desirable to dither each sub-carrier using a respective pseudo-random sequence (PRS) 38 that is unique among the sub-carriers of any one optical channel. This enables known cross-correlation techniques to be used to detect effects of each dither in the noisy optical signal received at the receiver modem 6. Preferably, the frequency of the dither signal (or, equivalently, the bit rate of the PRS 38) is selected to avoid interference with both sub-channel data streams modulated on each sub-carrier, and other control loops being used to control of optical communications system 2. In some embodiments, the frequency of the dither signal is less than 1 kHz. An advantage of using a PRS 38 to dither each sub-carrier is that precise time synchronization between the transmitter 4 and the receiver 6 is not essential. In cases where the transmitter 4 and the receiver 6 can be precisely time synchronized (e.g. both devices are synchronized to a common master clock) then, a deterministic sequence could be used (rather than a PRS), such as a square wave. In this case, one could only dither each subcarrier sequentially, which is significantly slower.

Returning to FIG. 3, in a second step, the processor 34 interacts with the receivers 30 to track changes in the BER of each sub-channel data stream recovered from the received optical signal. As may be seen in FIG. 4, the time series of BER values 40 for any given sub-channel data stream will show a BER variation Δ[log(BER)] that tracks the respective dither signal 36 applied to the corresponding sub-carrier. In cases where a sub-carrier is dithered using a respective pseudo-random sequence 38, the time series of BER values 40 detected at the corresponding receiver 30 will follow the applicable pseudo-random sequence 38. In this case, known cross-correlation techniques can be used to robustly determine the BER variation due to the imposed dither signal, even in the presence of BER variations due to other factors such as impairments of the link 6.

In a third step, the processor 34 calculates the relationship between the BER variation Δ[log(BER)] and the modulation depth ΔP of the applied dither signal, for each sub-carrier. In some embodiments, this relationship may be calculated by determining the respective BER variation Δ[log(BER)] as a function of the applied modulation depth ΔP. With this information, the processor 34 can estimate, in a fourth step, a respective optimal power setting for each sub-carrier that will optimize the BER of the optical channel as a whole. The processor 34 can then interact with the controller 18 to adjust the launch power level of each sub-carrier in accordance with the estimated optimal power settings.

In some embodiments, the channel optimization algorithm described above is iterative. In such cases, the step of estimating a respective optimal power setting for each sub-carrier can comprise calculation of a respective incremental adjustment of the power level of each sub-carrier. This arrangement is beneficial in that large step-changes in sub-carrier power levels can be avoided, while at the same time ensuring that the processor 34 and controller 18 converge to a set of sub-carrier power levels that optimizes the BER of the optical channel as a whole.

In the foregoing description, the time series of BER values of each sub-channel is tracked and used to determine the optimum sub-carrier power. It will be appreciated that other metrics of sub-channel quality may be used, if desired. For example, the per-sub-channel signal-to-noise ratio (SNR), or noise margin, may be used, if desired. Other usable metrics of sub-channel quality will be apparent to those of ordinary skill in the art, and may be employed, either alone or in combination, without departing from the scope of the present invention.

Although the invention has been described with reference to certain specific embodiments, various modifications thereof will be apparent to those skilled in the art without departing from the spirit and scope of the invention as outlined in the claims appended hereto.

We claim:

1. A method of controlling a multiple sub-carrier optical channel of an optical communications system, the method comprising:
    applying a respective dither signal to each sub-carrier by a transmitter modem of the optical communication system, wherein the multiple sub-carrier optical channel comprises at least two sub-carriers having respective different center frequencies and being modulated with respective sub-channel data streams within a spectral range allocated to a single optical channel of the optical communications system;
    detecting a respective quality metric of each sub-carrier by a receiver modem of the optical communication system;
    estimating a respective optimum power level of each sub-carrier by the receiver modem based on the applied dither signals and the detected quality metrics; and
    adjusting by the transmitter modem a respective power level of each sub-carrier in accordance with the estimated respective optimum power level of each sub-carrier,
    wherein the at least two sub-carriers are transmitted by the transmitter modem and received by the receiver modem and the at least two sub-carriers are routed through the optical communications system together.

2. The method of claim 1, wherein the respective quality metric of each sub-carrier comprises any one or more of:
    a bit error rate (BER); and
    a signal-to-noise ratio (SNR).

3. The method of claim 1, wherein applying a respective dither signal to each sub-carrier comprises modulating the power level of each sub-carrier in accordance with the respective dither signal.

4. The method of claim 3, wherein each dither signal comprises any one of:
    a periodic square wave signal; and
    a pseudo-random sequence.

5. The method of claim 3, wherein detecting a respective per-sub-channel bit error rate of each sub-carrier comprises, for each sub-carrier:
    detecting a respective time series of quality metric values; and
    calculating a correlation between the time series of quality metric values and the respective dither signal applied to the sub-carrier.

6. The method of claim 3, wherein estimating a respective optimum power level of each sub-carrier comprises:
    determining a relationship between a variation in the quality metric value due to the respective dither signal and a modulation depth of the respective sub-carrier due to the dither signal; and
    calculating, based on the determined relationship, a respective optimum power level of each sub-carrier that optimizes a quality metric value of the multiple sub-carrier optical channel as a whole.

7. The method of claim 6, wherein calculating a respective optimum power level of each sub-carrier comprises iteratively calculating a respective incremental power level adjustment for each sub-carrier.

8. A system for controlling a multiple sub-carrier optical channel of an optical communications system, the system comprising:
    a controller for controlling a transmitter modem of the optical communications system to a apply a respective dither signal to each sub-carrier, wherein the multiple sub-carrier optical channel comprises at least two sub-carriers having respective different center frequencies and being modulated with respective sub-channel data streams within a spectral range allocated to a single optical channel of the optical communications system;
    a receiver modem of the optical communications system configured to detect a respective quality metric of each sub-carrier; and
    at least one processor configured to
        i) estimate a respective optimum power level of each sub-carrier based on the applied dither signals and the detected quality metrics, and
        ii) adjust a respective power level of each sub-carrier in accordance with the estimated respective optimum power level of each sub-carrier,
    wherein the at least two sub-carriers are transmitted by the transmitter modem and received by the receiver modem and the at least two sub-carriers are routed through the optical communications system together.

9. The system of claim 8, wherein the respective quality metric of each subcarrier comprises any one or more of:
    a bit error rate (BER); and
    a signal-to-noise ratio (SNR).

10. The system of claim 8, wherein applying a respective dither signal to each sub-carrier comprises modulating the power level of each sub-carrier in accordance with the respective dither signal.

11. The system of claim 10, wherein each dither signal comprises any one of:
a periodic square wave signal; and
a pseudo-random sequence.

12. The system of claim 10, wherein detecting a respective per-sub-channel bit error rate of each sub-carrier comprises, for each sub-carrier:
detecting a respective time series of quality metric values; and
calculating a correlation between the time series of quality metric values and the respective dither signal applied to the sub-carrier.

13. The system of claim 10, wherein estimating a respective optimum power level of each sub-carrier comprises:
determining a relationship between a variation in the quality metric value due to the respective dither signal and a modulation depth of the respective sub-carrier due to the dither signal; and
calculating, based on the determined relationship, a respective optimum power level of each sub-carrier that optimizes a quality metric value of the multiple sub-carrier optical channel as a whole.

14. The system of claim 13, wherein calculating a respective optimum power level of each sub-carrier comprises iteratively calculating a respective incremental power level adjustment for each sub-carrier.

15. The system of claim 8, wherein the applied dither signals have a frequency selected to avoid interference with sub-carrier data streams modulated on each sub-carrier and other control loops used for control in the optical communication system.

16. The system of claim 8, wherein the applied dither signals have a frequency of less than 1kHz.

17. The system of claim 8, wherein the applied dither signals are applied to each of the at least two sub-carriers simultaneously by the transmitter modem.

18. The system of claim 8, wherein the applied dither signals are applied to each of the at least two sub-carriers simultaneously by the transmitter modem with a unique data sequence for each of the at least two sub-carriers.

19. The system of claim 18, wherein cross-correlation is used to detect effects of each of the applied dither signals in a noisy optical signal received by the receiver modem based on the unique data sequence for each of the at least two sub-carriers.

20. The system of claim 8, wherein the optical communication system utilizes Optical Orthogonal Frequency Division Multiplexing.

* * * * *